United States Patent [19]

Login et al.

[11] Patent Number: 5,194,546

[45] Date of Patent: Mar. 16, 1993

[54] PROCESS FOR PREPARING FUNCTIONAL COPOLYMERS OF A VINYL LACTAM AND AN AMINO ALKENE OR HYDROXY ALKENE IN WATER SOLUTION

[75] Inventors: Robert B. Login, Oakland; Jenn S. Shih, Paramus; Jui-Chang Chuang, Wayne, all of N.J.

[73] Assignee: ISP Investments Inc., Wilmington, Del.

[21] Appl. No.: 879,411

[22] Filed: May 6, 1992

[51] Int. Cl.$^5$ ............................................. C08L 29/02
[52] U.S. Cl. ................................... 526/263; 526/264
[58] Field of Search .................................. 526/263, 264

[56] References Cited

U.S. PATENT DOCUMENTS 3,563,968  2/1971  Merjan et al. ...................... 526/210

*Primary Examiner*—Maurice J. Welsh
*Attorney, Agent, or Firm*—Walter Katz; Marilyn J. Maue; Joshua J. Ward

[57] ABSTRACT

What is provided herein are copolymers of a vinyl lactam and a hydroxy or amino alkene monomers, which contain a hydroxy or amino functionality therein. These copolymers are prepared by reaction between a vinyl lactam, e.g. vinylpyrrolidone (VP) or vinyl caprolactam (VCL), a functional polymerizable monomer, e.g. ω-amino-1-alkene (AA) or ω-hydroxy-1-alkene (HA), in water solution in the presence of a free radical initiator under predetermined reaction conditions.

6 Claims, No Drawings

PROCESS FOR PREPARING FUNCTIONAL COPOLYMERS OF A VINYL LACTAM AND AN AMINO ALKENE OR HYDROXY ALKENE IN WATER SOLUTION

BACKGROUND OF THE INVENTION

1. Field of the Invention

This invention relates to copolymers of a vinyl lactam, e.g. vinylpyrrolidone or vinyl caprolactam and an ethylenically unsaturated monomer containing an amino or hydroxy functionality, and, more particularly, to a process for preparing such functional copolymers by copolymerization of vinyl lactam and amino alkene or hydroxy alkene monomers in aqueous solution.

2. Description of the Prior Art

Merijan, in U.S. Pat. No. 3,563,968, described the preparation of functional graft homopolymers of vinyl lactams, e.g. vinylpyrrolidone, by reaction of polyvinylpyrrolidone with allylamine or allylalcohol in ethanol solvent in a bomb reactor at 130°–140° C.

Kitchell, in U.S. Pat. Nos. 4,692,328 and 4,772,484, disclosed the further reaction of such functional homopolymers by crosslinking with glutaraldehyde to form a gel which was useful in biological applications.

These and other patents and publications, however, have not provided copolymers of a vinyl lactam monomer and a functional polymerizable monomer, e.g. a hydroxy or amino alkene, and a process for making such functional copolymers in water solution.

Accordingly, it is an object of this invention to provide functional copolymers of a vinyl lactam, e.g. vinylpyrrolidone, and a hydroxy or amino alkene, which contain an aminoalkyl or hydroxyalkyl functionality, and wherein the polymerization is carried out in water under predetermined reaction conditions, and unreacted functional monomer can be removed after copolymerization.

SUMMARY OF THE INVENTION

What is provided herein are copolymers of a vinyl lactam and a hydroxy or amino alkene monomers, which contain a hydroxy or amino functionality therein. These copolymers are prepared by reaction between a vinyl lactam, e.g. vinylpyrrolidone (VP) or vinyl caprolactam (VCL), and a functional polymerizable monomer, e.g. ω-amino-1-alkene (AA) or ω-hydroxy-1-alkene (HA), in water solution in the presence of a free radical initiator under predetermined reaction conditions.

DETAILED DESCRIPTION OF THE INVENTION

The functional copolymers of the invention are prepared by copolymerization of the functional vinyl lactam and functional polymerizable monomer in water solution. Typical process parameters of the invention are given in Table 1 below, where the ranges given are in parts by weight.

TABLE 1

| | Reaction Conditions | | |
|---|---|---|---|
| Parameter | Suitable | Preferable | Most Preferable |
| Wt. Ratio of VP/allylamine or allylalcohol | 99/1–1/1 | 97/3–70/30 | 95/5–80/20 |
| % Initiator (based on total wt. monomers) | 0.2–10 | 0.2–5 | 0.2–2 |
| Temp (°C.) | 20–130 | 40–80 | 50–70 |
| Pressure (atm) | 1–5 | 1–3 | 1–2 |
| % Solids in Product | 5–50 | 10–40 | 20–30 |

EXAMPLES 1–4

A 1-liter, 4-necked reaction kettle equipped with a dry ice/acetone condenser, a mechanical stirrer, a nitrogen purge adaptor, and a thermocouple connected to a temperature controller was charged with predetermined amounts of deionized water, vinylpyrrolidone and allylamine or allylalcohol (see Table 2 below).

The charged reactor was heated to a reaction temperature during a period of 30 minutes with a nitrogen purge being maintained throughout the process. Thereafter, the reactor was maintained at the reaction temperature for another 30 minutes while 520 microliters of t-butylperoxypivalate (Lupersol 11, 75% active) was added. The polymerization was carried out during a period of 16 hours. Then an additional 200 ml of distilled water was added to the reaction product and a mixture of water and unreacted AA or HA was distilled off. The reactor then was cooled to room temperature and its contents were poured into a thin pan container. The liquid was freeze-dried overnight and thereafter dried in a vacuum oven at 90° C. The product was a powder of the functional copolymer of VP and AA or HA and having the properties given in Table 2 below.

TABLE 2

| | Reaction Conditions | | | | | Properties of Product | | |
|---|---|---|---|---|---|---|---|---|
| Ex. No. | Vinylpyrrolidone (g) | Allylamine (g) | Allylalcohol (g) | Water (g) | Temp (°C.) | *K-Value | Tg (°C.) | Functional —NH$_2$ (meq NH$_2$/g) |
| 1 | 90 | 10 | — | 300 | 65 | 34.5 | 126 | 0.412 |
| 2 | 90 | 10 | — | 450 | 130 | 33.3 | 117 | 0.486 |
| 3 | 90 | — | 10 | 300 | 65 | 36.3 | 131 | — |
| 4 | 90 | — | 10 | 300 | 130 | 32.5 | 129 | — |

*Fikentscher K value

While the invention has been described with particular reference to certain embodiments thereof, it will be understood that changes and modifications may be made which are within the skill of the art. Accordingly, it is intended to be bound only by the following claims, in which:

What is claimed is:

1. A process for preparing functional copolymers of a vinyl lactam monomer and an amino alkene or hydroxy alkene monomer which comprises reacting a vinyl lactam and a polymerizable functional monomer selected from amino alkene or hydroxy alkene monomers in a weight ratio of about 99/1 to 1/1, respectively, in water solution at about a 5–50% solids content, at a temperature of about 20° to 130° C., in the presence of about 0.2–10% by weight based on total monomers of a free radical initiator, and at a pressure of about 1–5 atmospheres.

2. A process according to claim 1 wherein said vinyl lactam is vinylpyrrolidone.

3. A process according to claim 1 wherein said polymerizable functional monomer is allylamine.

4. A process according to claim 1 wherein said polymerizable functional monomer is allylalcohol.

5. A process according to claim 2 wherein said weight ratio of vinylpyrrolidone to polymerizable functional monomer is 97/3–70/30, said solids content is 10–40%, said temperature is 40°–80° C., said initiator level is 0.2–5%, and said pressure is 1–3 atmospheres.

6. A process according to claim 2 wherein said weight ratio of vinylpyrrolidone to polymerizable functional monomer is 95/5–80/20, said solids content is 20–30%, said temperature is 50°–70° C., said initiator level is 0.2–2%, and said presure is 1–2 atmospheres.

* * * * *